United States Patent [19]
Frank

[11] 3,871,855
[45] Mar. 18, 1975

[54] APPARATUS FOR ROLL-PRESS FORMING HEAT-SOFTENED GLASS SHEETS

[75] Inventor: Robert G. Frank, Murrysville, Pa.

[73] Assignee: PPG Industries, Inc., Pittsburgh, Pa.

[22] Filed: July 5, 1973

[21] Appl. No.: 376,751

[52] U.S. Cl. .................. 65/245, 65/253, 65/273
[51] Int. Cl. ............................................ C03b 23/02
[58] Field of Search ............ 65/106, 245, 253, 273, 65/275; 100/155 R, 155 G

[56] References Cited
UNITED STATES PATENTS

| | | |
|---|---|---|
| 2,572,276 | 10/1951 | Moe .............................. 100/155 R |
| 2,948,646 | 8/1960 | Richardson ..................... 100/155 G |
| 3,494,990 | 2/1970 | Balint ................................... 264/71 |
| 3,701,644 | 10/1972 | Frank .................................. 65/106 |

Primary Examiner—Arthur D. Kellogg
Attorney, Agent, or Firm—Edward I. Mates; Thomas F. Shanahan

[57] ABSTRACT

Improvements in roll forming apparatus for shaping heat-softened sheets comprising segmented shaping rolls incorporating means to reduce and even eliminate certain surface markings that sometimes result from shaping thermoplastic sheets such as glass sheets by roll forming.

9 Claims, 7 Drawing Figures

PATENTED MAR 18 1975 3,871,855
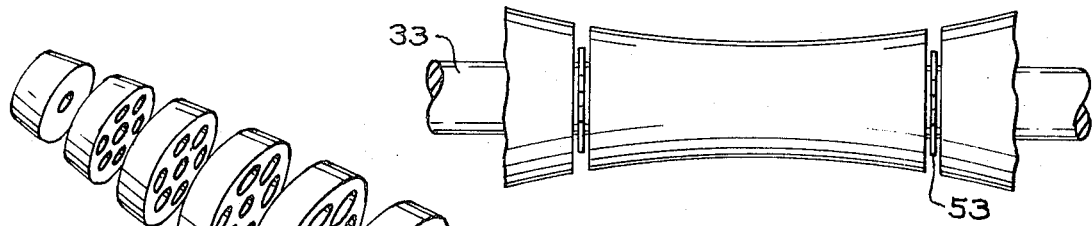
FIG.4
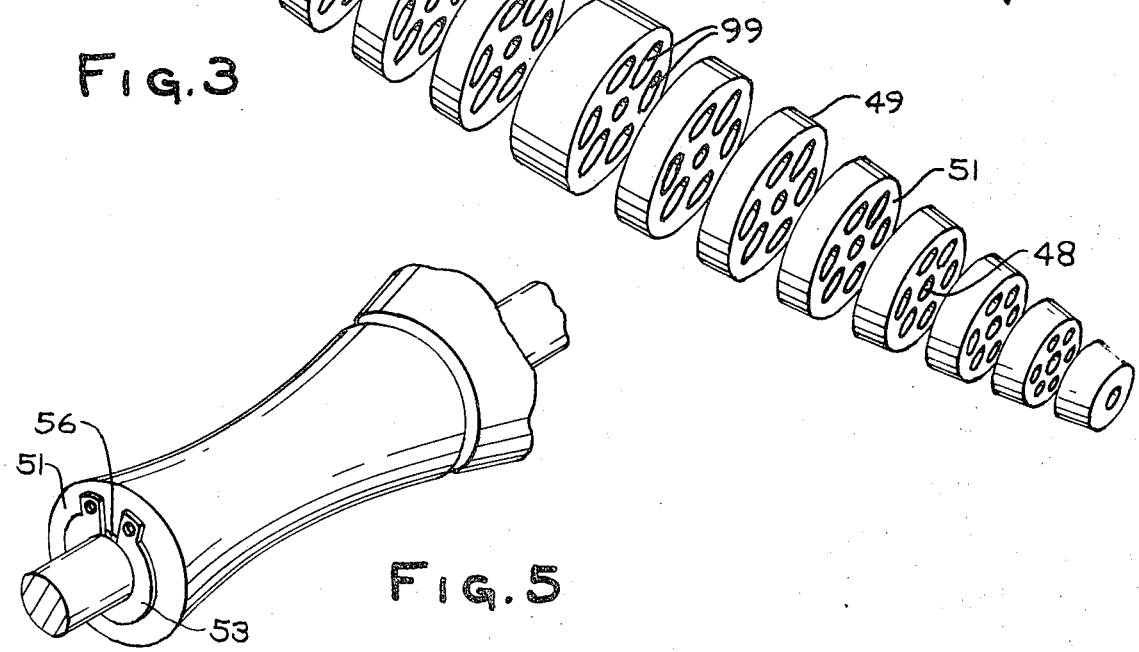
FIG.3
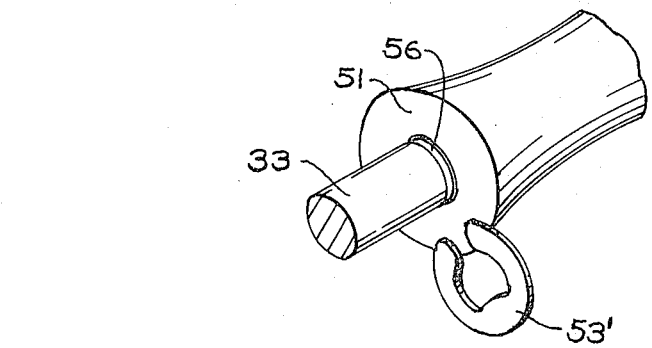
FIG.5
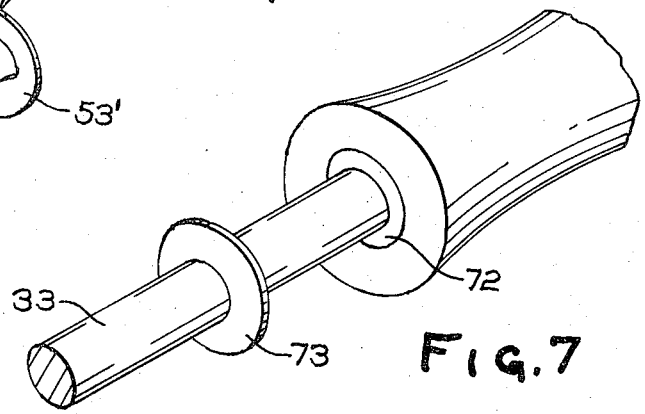
FIG.6
FIG.7

APPARATUS FOR ROLL-PRESS FORMING HEAT-SOFTENED GLASS SHEETS

BACKGROUND OF THE INVENTION

The present invention relates to shaping glass sheets, and particularly concerns improvements in apparatus for shaping a series of glass sheets by the roll forming method. According to the roll forming method, a series of heat-softened glass sheets is conveyed between an upper set and a lower set of shaping rolls of complementary shape. Each set is carried by a series of shaping roll supporting shafts adjustably positioned along a movable roll housing. When each glass sheet reaches a position between the sets of shaping rolls, at least one of the sets moves relative to the other set into a sheet engaging position for sufficient time for the shape of the rolls to be impressed on the glass sheet as the latter passes between the sets of shaping rolls. The sets are separated and the shaped glass sheet proceeds to a cooling or quenching station where the glass sheet is cooled to impart either a partial or full temper or an anneal depending on the rate of the cooling. When the next heat-softened glass sheet in the series arrives between said sets, the sets are again moved relative to one another to their sheet engaging position. Such continuous sheet movement has resulted in increasing the rate of production of shaped glass sheets.

Prior to the development of the roll forming method, horizontally disposed glass sheets had been bent to shape on a mass production method by moving a series of glass sheets through a furnace and stopping the movement of each sheet in turn when the latter was aligned between a pair of shaping members, as in U.S. Pat. No. 3,374,080 to Robert W. Wheeler or in U.S. Pat. No. 3,468,645 to Harold A. McMaster et al. Furthermore, glass has also been press bent to a desired shape one sheet at a time, as evidenced by U.S. Pat. No. 3,414,395 to Thomas J. Reese and Russell J. Corsi. However, the latter method is not adapted for use in high speed production and is used primarily to produce massive glass shapes weighing hundreds of pounds and more.

The need for curved glass sheets has increased tremendously in recent years, particularly with the increase in use of curved glass for windshields, sidelights and rear windows of automobiles. The problem of increasing the rate of production of shaped glass sheets on a mass production line has been recognized and new methods and apparatus that do not necessarily require glass sheets to be stopped at a shaping station have been developed, as is evidenced by U.S. Pat. No. 3,701,644 to Robert G. Frank.

The Frank patented apparatus has capabilities of shaping glass sheets to a family of simple shapes about one axis only along the path of glass sheet movement through the roll forming apparatus. The Frank patented apparatus is also capable of producing compound bends comprising bends about two mutually perpendicular axes or bends whose radii of curvature vary from portion to portion of the bent sheets along the path of sheet movement through the roll forming apparatus. From time to time, the roll forming apparatus of the prior art has produced shaped sheets having surface marks. Such marks impair the optical properties of the glass sheets, sometimes to such an extent as to make them unsuitable for commercial use.

In order to minimize marking of the glass surface due to rubbing by portions of the shaping rolls whose peripheral velocity differs sufficiently from the speed of the sheet moving through the roll forming station to cause observable rubbing marks, each shaping roll is segmented and only selected segments of the segmented shaping rolls of the lower set, for example, are fixed to shafts to rotate therewith and the remaining segments of the lower set are freely rotatable. However, even though washers were disposed between adjacent shaping roll segments to minimize the friction therebetween, after some time in production, the shaping roll segments adjacent those fixed to the rotatable shafts began to rotate at the same rotational speed as the shaping roll segments fixed to rotate with the shafts. The difference in peripheral speed between segments rotating in unison by friction is believed to cause surface marking.

The present invention makes it possible to reduce the severity and frequency of surface optical defects associated with prior art roll forming apparatus to such an extent that the resulting articles are acceptable to the customer for both curvature and optical properties. At the same time, the present invention makes it possible to retain the benefits of the high rate of production that characterizes roll forming operations.

SUMMARY OF THE INVENTION

While it is understood that the present invention is suitable to shape deformable sheets of any composition, it will be described in terms of shaping glass sheets by the roll forming method because optical properties of shaped glass sheets are very critical.

The present invention makes it possible to reduce both the severity and the frequency of the surface defects attributed to roll forming by providing at least some of the shaping roll segments with means to reduce the frictional force between adjacent segments. According to one embodiment of the invention, means is provided to lighten certain shaping roll segments. This means preferably involves removing a portion of the mass of said certain segments, preferably by drilling apertures spaced outwardly from the shaft and inwardly from the outer surface of the lightened segment. The apertures reduce the mass of the segments so treated.

According to another embodiment of the invention, adjacent segments are either treated with low friction coatings such as boron nitride or are separated from one another by snap rings instead of washers, thus reducing the area of the washers that are in rubbing contact with adjacent segments.

The present invention will be understood better in the light of a description of an illustrative embodiment and variations thereof that follows.

BRIEF DESCRIPTION OF THE DRAWINGS

In the drawings which form part of the description of the illustrative embodiments that follows;

FIG. 3 is an exploded view of a segmented shaping roll, showing how means is provided to reduce the mass of shaping roll segments according to one embodiment of this invention;

FIG. 4 and 5 are fragmentary, enlarged elevation and perspective views, respectively, of an alternative illustrative embodiment of the present invention;

FIG. 6 is an enlarged exploded view of an open, flexible, ring type of washer that is an important element of an alternative illustrative embodiment; and FIG. 7 is a fragmentary perspective view of still another embodiment of the present invention.

DESCRIPTION OF THE PREFERRED EMBODIMENT

Figure 1:
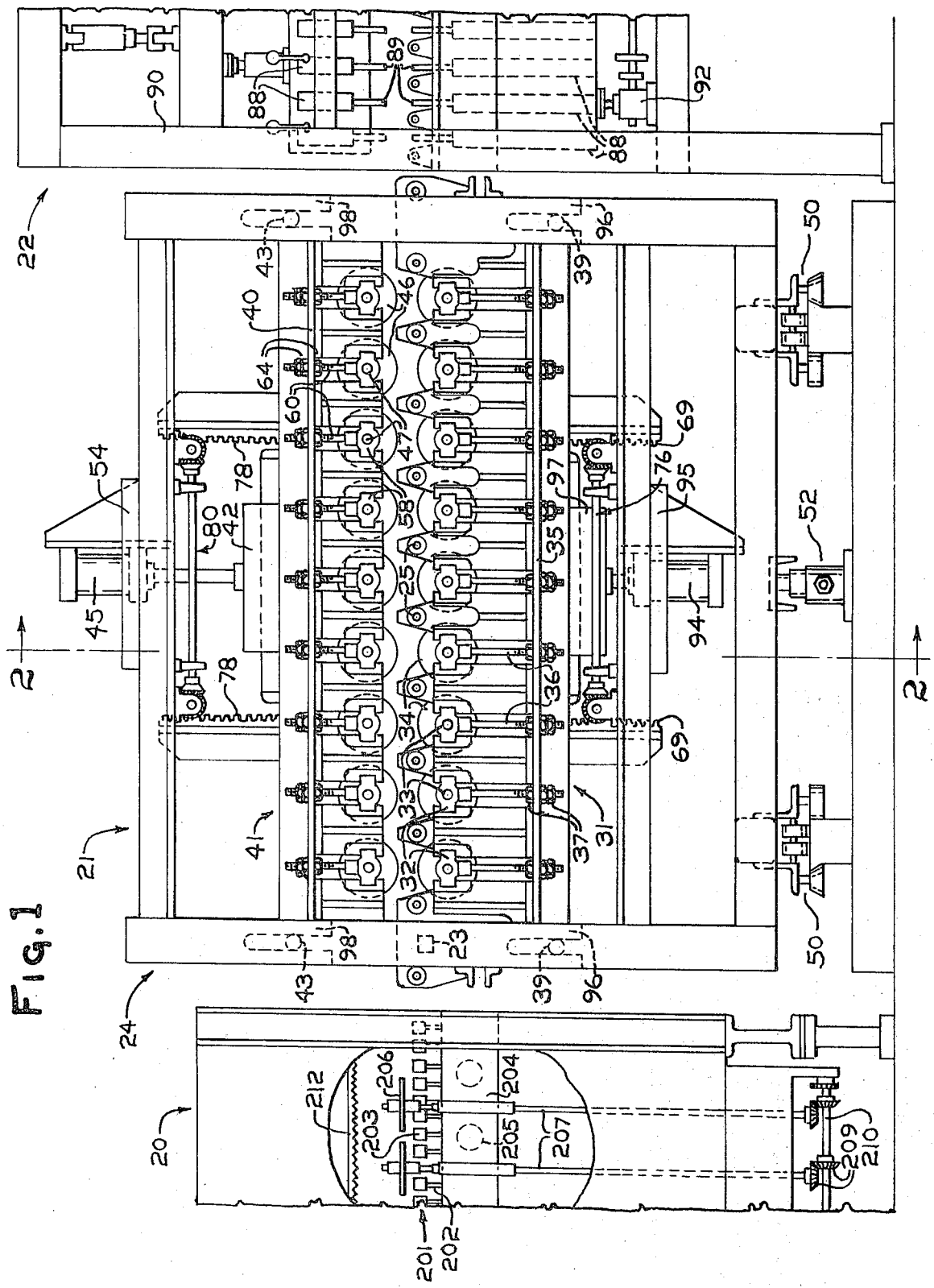
FIG. 1 is a longitudinal elevation of a portion of a preferred embodiment of apparatus of the roll pressing type conforming to the present invention.

Referring to the drawings, FIG. 1 discloses a side view of an important part of roll forming apparatus conforming to the present invention. Generally, the apparatus is based on that disclosed in FIG. 21 of U.S. Pat. No. 3,701,644 to Robert G. Frank. The roll forming apparatus comprises a heating furnace 20 of the gas hearth type, a roll forming station 21 and a cooling or quenching station 22 also depicted in detail in the aforesaid Frank patent. A conveyor system conveys a series of glass sheets through the tunnel 20, the roll forming station 21 and the cooling or quenching station 22.

A glass sensing device 23 of the type well known in the art, such as an ultraviolet sensing device, is located near the entrance of the roll forming station 21 to detect the passage of the trailing edge of a glass sheet to actuate operation of the roll forming station to perform its sheet forming function.

While the illustrative embodiment of the present invention shows a heated furnace of the gas hearth type, which is based on apparatus depicted in U.S. Pat. No. 3,233,501 to James C. Fredley et al., assigned to PPG Industries, Inc., the gas hearth furnace may also be that disclosed in U.S. Pat. Nos. 3,332,759 and 3,332,760 to Harold E. McMaster et al. Furthermore, the conveyor for the furnace may be of the type containing glass engaging members that move the glass sheets through the hot furnace by edge contact only, or of the roller hearth type such as depicted in U.S. Pat. No. 3,245,772 to James H. Cypher et al., assigned to PPG Industries, Inc., where glass sheets are conveyed in succession over a series of longitudinally spaced conveyor rolls, which are rotated in unison to propel the glass sheets through a heated tunnel-like furnace.

In a gaseous hearth system of the preferred embodiment of the present invention, the furnace 20 is provided with a flat bed formed from a series of modules 201 arranged geometrically like a mosaic in close juxtaposition to each other. Each module has an upper terminus of rectangular configuration. The upper termini lay in a common plane that is obliquely arranged at a small angle (preferably approximately 5°) to the horizontal transversely of the lengthwise dimension of the bed. The latter extends throughout the length of the furnace.

In a gas hearth, the modules 201 are arranged in successive rows crossing the path of travel intended for glass sheets undergoing treatment. Each row of modules is at an oblique angle of about 10° to the path taken by the glass sheets through the length of the furnace 20. Each module has a relatively narrow stem 202 opening up into a module plenum chamber 203 positioned below the gas hearth bed and acting as a support for the bed. Each module extends upward from a common plenum chamber 204 and is substantially enclosed in the spaced from adjacent modules by an exhaust zone. The exhaust zones communicate with exhaust passages 205 extending transversely of the common plenum chamber 204 below the surface of the gas hearth bed and above common plenum chamber 204. The bed is adjusted to such a level that the plane of the upper termini of the modules lies parallel to but just below an oblique plane defined by the upper surface of rotatable conveyor rolls 25 of the roll forming station 21. As an alternative, the gas hearth bed may be composed of a relatively thick apertured wall having hot gas delivery passageways of circular cross-section arranged in a mosaic pattern in an upward direction from a plenum chamber to the upper surface of the wall. Each delivery passageway is surrounded by a series of escape ports of larger circular cross-section as depicted in U.S. Pat. No. 3,455,669 to Harold E. McMaster et al. in this alternative gaseous hearth construction.

In the gas hearth furnace, glass sheets are supported by a thin gaseous bed in an oblique plane and are engaged along their lower side edges only by means of a series of rotating driving discs 206 disposed in a series along the lower side edges of the gas hearth bed. The discs rotate in unison to propel a series of glass sheets along the length of the gas hearth bed toward the roll forming station 21. The discs 206 are driven in unison by drive shafts 207. The latter in turn are driven through spur gears 209 by a main drive shaft 210. Electrical resistance heaters 212 are provided in the roof of the heating furnace 20 to irradiate heat against the upper surface of each sheet while its lower surface is both heated and supported by the hot gases applied through the modules against said lower surface.

The conveyor rolls 25 of the roll forming station 21 are disposed to form an upper common tangential plane which is an extension of the oblique plane of support provided by the gas hearth bed formed by the gas applied through the array of modules in the furnace 20.

Figure 2:
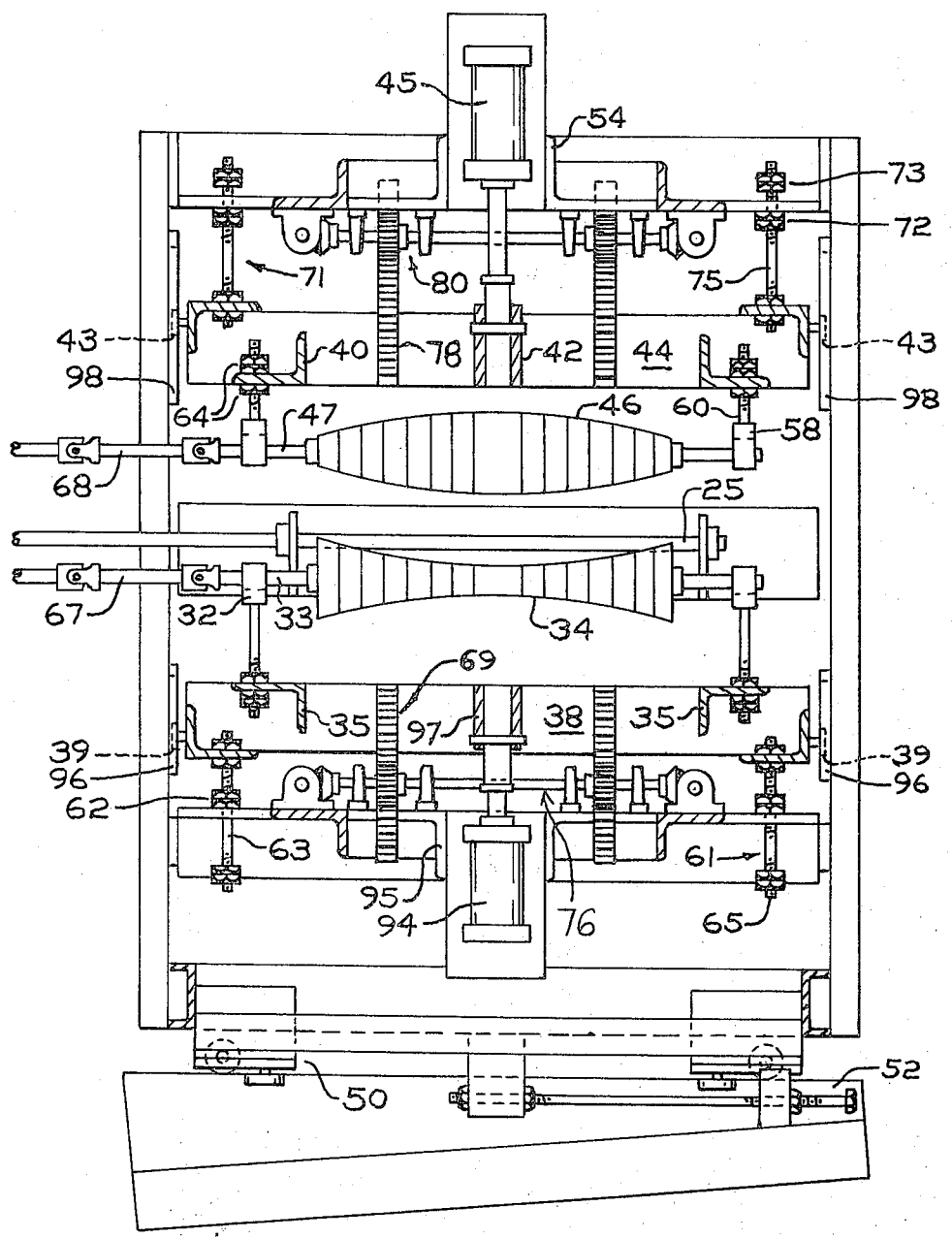
FIG. 2 is a fragmentary cross-sectional view taken along the lines 2—2 of FIG. 1, showing how the illustrative embodiment is disposed in its retracted position.

The roll forming station 21 of the present invention comprises an open reinforced frame structure 24 to which are movably supported a lower shaping roll housing 31 and an upper shaping roll housing 41. Both housings are oriented in an oblique plane extending at an angle of approximately 5° to the horizontal to be parallel to the oblique surface of the gas hearth bed in the furnace 20. The lower roll housing 31 comprises a pair of sets of vertical brackets 32, each arranged in a horizontal row to receive one or the other opposite axial ends of one of a series of straight lower common shafts 33. The brackets 32 on the right side of FIGS. 2 and 3 are disposed in spaced positions along a horizontal plane lower than the horizontal plane along which the horizontal line of brackets to the left of FIGS. 2 and 3 are disposed. Thus, the series of common shafts 33 are capable of alignment with one another in a plane parallel to the plane of support provided by the gas hearth bed in the tunnel-like furnace.

Each of the lower common shafts 33 rotatably supports one of a series of lower segmented shaping rolls 34. Each segment of the segmented rolls 34 is two inches in axial length except for the centermost segments which are four inches long. Each central shaping segment is flanked by seven flanking shaping segments on each side thereof.

A pair of apertured longitudinal angle members 35 is supported by the lower roll housing 31 with their apertures aligned below apertures in each of the brackets 32 to receive the lower ends of threaded shafts 36. Suitable lock nuts 37 are provided to adjust the axial position of the threaded shafts 36 relative to the angle member 35 so as to fix the position of each bracket 32 relative to the lower roll housing 31. Each angle member 35 interconnects a pair of lower end plates 38. A roller 39 is attached to each end of each lower end plate 38.

The vertical position of each bracket 32 determined by adjustment of its associated shaft 36, controls the position of an end of a lower common shaft 33. This establishes the orientation of the segmented rolls 34 that are mounted on the shafts 33. Each shaft 33 is straight to facilitate mounting and replacement of a segmented roll of desired configuration thereon. It is thus a simple matter to remove one set of shaping rolls conforming to one configuration and replace it with another set of shaping rolls conforming to another configuration whenever it is required to produce a different part.

The lower roll housing 31 is rigidly attached to a lower vertical piston 94 mounted on a piston support structure 95 attached to the open reinforced frame structure 24. A pair of lower vertically slotted plates 96 are carried by structure 24 for receiving the rollers 39 attached to each end plate 38 of the lower roll housing 31. A cross beam 97 is attached to the upper end of piston 94 and interconnects lower apertured angle members 35 to enable the lower roll housing 31 and its set of lower shaping rolls 34 to move in unison in response to actuation by piston 94.

The open reinforced frame structure 24 also carries two pairs of upper vertically slotted plates 98 that receive upper guide rollers 43 fixed to the ends of upper plates 44 which interconnect the opposite ends of a pair of upper apertured longitudinal angle members 40 that form part of the upper roll housing 41. The upper angle members 40 are attached to a cross beam 42 which is fixed to a free end of an upper piston 45, which is downwardly extendable. A cylinder for the piston is supported on an upper piston support structure 54 forming part of the reinforced frame structure 24.

In vertical planes intermediate the vertical planes occupied by the conveyor rolls 25 and in alignment with the vertical planes occupied by the lower set of segmented shaping rolls 34, the upper roll housing 41 supports a set of upper segmented shaping rolls 46, each comprising a plurality of segments mounted on a straight upper common shaft 47 for each upper shaping roll 46. The shape of each segment of each upper shaping roll 46 is complementary to the shape of the corresponding segment of its corresponding lower shaping roll 34.

The vertical position of each of the upper segmented rolls 46 is adjustable in a manner similar to the adjustment provided for the lower segmented rolls 34. For example, each upper shaft 47 is received rotatably in apertures in upper shaft brackets 58. The latter are rigidly connected at their upper ends to the lower ends of externally threaded rods 60. The latter entend upward through one of the apertures in one of the upper apertured longitudinal angle members 40 and are fixed in position to the latter through pairs of adjustment nuts 64 for each threaded rod, one nut being below angle member 40 and at least one nut mounted above the angle member 40 to determine the vertical position of each end of each upper common shaft 47.

As seen in FIG. 2 the segments of the lower segmented rolls 34 form a substantially continuous concave contour in the axial direction of the straight common shaft 33. This shape conforms to the shape desired about an axis parallel to the path the glass sheets take through the roll forming station for an incremental portion of each sheet shaped by roll forming. The segments of the upper segmented rolls 46 have generally convex configurations that are complementary to the configuration of the lower roll segments they oppose. Hence, if all the upper segmented rolls 46 have their shafts 47 in alignment in an upper oblique plane and the lower segmented rolls 34 have their shafts aligned in a lower oblique plane, when piston 94 is extended upwardly, segmented rolls 34 are lifted to an oblique plane above the oblique plane occupied by the conveyor rolls 25 and the upper and lower surfaces of the different increments of a flat glass sheet moving through the roll forming station are simultaneously engaged by the different pairs of rotatable rolls to impose bending forces on different increments of the traveling sheet simultaneously.

The composition of the roll segments is very important to insure proper operation of the roll forming apparatus with minimum glass breakage or glass marking. The material must have low thermal conductivity to minimize thermal shock on the hot glass when the latter engages the relatively cold shaping rolls. The rolls must have a low coefficient of thermal expansion over a wide temperature range of approximately 600°F. from room temperature to an elevated temperature that the rolls attain on contacting the hot glass. They must be of a composition that does not react chemically with glass, that is durable over said wide temperature range, and is readily shaped or machined to complex contours.

To meet these requirements, the upper segmented shaping rolls 46 and the lower segmented shaping rolls 34 are composed of an asbestos cement sold by Johns Mansville under the trademark of TRANSITE. Furthermore, each of the segments is separated by a low-friction washer having a thickness of approximately one-sixteenth inch.

Suitable driving means is provided to rotate conveyor rolls 25 and the fixed segments of shaping rolls 34 and 46 at the same peripheral speed. Conveyor rolls 25 are directly connected to a main drive shaft (not shown). Shafts 33 and 46, which rotatably support the shaping rolls 34 and 47, respectively, are connected to their respective drive shafts through flexible coupling means 67 and 68.

The entire open frame structure 24 is mounted on transverse guides 50 for transverse movement by adjustment means 52.

The vertical position of each bracket 32 can be adjusted by adjustment of its associated lower threaded shaft 36 and the vertical position of each upper shaft bracket 58 can be adjusted by adjustment of its associated upper threaded rod 60. The vertical position to which each bracket 32 is adjusted controls the vertical position of each lower shaft 33 near an adjacent endmost segment of the lower shaping roll 34 carried by said lower shaft. By adjusting the positions of successive brackets 32 along opposite side edges of the roll forming station 21 in positions along curved paths corresponding to the shapes desired along the path taken by the opposite side edges of the moving sheets and adjusting the positions of corresponding upper shaft brackets 58 to be along curved paths parallel at each side edge to the curved path along which the corresponding lower shaft brackets 32 are located, it is possible to simultaneously bend the moving sheets by roll forming about two mutually perpendicular axes of bending, one axis parallel to the path of sheet movement as defined by the complementary shapes of the rotating shaping rolls 34 and 46 along their axes of rotation defined by shafts 33 and 47, and the other axes transverse to the path of sheet movement as defined by the positions of successive brackets along opposite sides of the roll forming station.

If the upper and lower shafts 47 and 33 are adjusted in non-linear arrangement along similar curved lines, then glass sheets can be roll formed into a compound curvature comprising a curved element about an axis parallel to the path of sheet movement and a curved element normal to said axis without impairing the smoothness of curvature of the glass sheet surface.

The roll forming apparatus can also shape sheets to a complex compound bend by mounting shafts supporting certain pairs of segmented shaping rolls about axes tilted with respect to other rolls in vertical planes spaced along the length of the roll forming station to impart a twist to the moving sheets engaged between the sets of rotating shaping rolls. This twist, in turn, can be provided with the simple or compound shapes resulting from roll forming moving sheets between sets of shaping rolls by modifying the positions of the respective brackets 32 and 58 to combine the arrangement needed to impart a twist with the arrangement needed for either a simple or compound bend as may be needed.

The roll forming apparatus is also capable of shaping sheets to a complex shape where the radius of curvature of the sheet varies from one end to the other of the sheet in a direction parallel to its path of movement through the roll forming station by mounting a pair of shaping rolls having a relatively large radius of curvature on shafts located toward one end of the roll forming station, mounting a pair of shaping rolls having a relatively small radius of curvature on shafts located toward the other end of the roll forming station, and mounting pairs of shaping rolls having radii of curvature of intermediate size on shafts located intermediate the aforementioned shafts. For example, simultaneous engagement of a sheet with shaping rolls having 40 inch radius of curvature at one end thereof, and with shaping rolls having 60 inch radius of curvature at the other end and with shaping rolls of intermediate radii of curvature generally increasing from one end to the other produces sheets of non-uniform radii of curvature from leading to trailing edge. This latter complicated shape can also be combined with the other variations in arranging the positions of the shaft supporting brackets to provide even more complicated shapes.

If the upward movement of the lower set of shaping rolls 34 toward the upper set of shaping rolls 46 is allowed to reach a position of minimum spacing where the roll sets are separated from one another by a distance equal to the glass sheet thickness, each upper set of shaping rolls 47 engages the upper glass sheet surface along lines aligned with lines along which the corresponding shaping rolls 34 of the lower set engage the lower glass sheet surface. In order to minimize surface marking due to simultaneous rolling engagement by opposing shaping rolls, the apparatus has its lower shaping roll housing 31 provided with lower stop members 61 and its upper shaping roll housing 41 provided with upper stop members 71.

Each of the lower stop members 61 comprises a lower limit adjustment means 62 and an upper limit adjustment means 63 in the form of lock nuts adjustably mounted on one of a plurality of lower threaded shafts 65. The latter is rigidly secured at its upper end to the lower shaping roll housing and extends through an aperture in a lower cross member of the open reinforced frame structure 24 with lower limit adjustment means 62 disposed above the lower cross member and upper limit adjustment means 63 disposed below the cross member. Each of the upper stop members 71 comprises an upper limit adjustment means 72 and a lower limit adjustment means 73 in the form of lock nuts adjustably mounted in mirror image relation to upper shaping rolls housing 41 on one of a plurality of upper threaded shafts 75. The lower limit adjustment means 73 of the upper shaping roll housing 41 and the upper limit adjustment means 63 of the lower shaping roll housing 31 are preferably adjusted according to the thickness of glass sheets G undergoing roll forming so that the minimum spacing between corresponding shaping rolls in the direction of glass sheet thickness exceeds the glass sheet thickness by a predetermined amount.

Since the roll forming apparatus is capable of producing many varieties of shapes, it is essential that the apparatus be capable of rapid adjustment from one pattern to another. For some pattern changes, it is necessary to change some or all of the segmented rolls. In the present apparatus, the segmented shaping rolls 34 and 46 may be readily replaced from shafts 33 and 47 by removing a bracket from one end of each shaft, sliding the segments to be removed off each shaft and sliding a new set of segments onto the empty shaft where needed and replacing the supporting bracket to its shaft supporting position.

In order to insure that the upper roll housing 41 remains in proper alignment with the lower roll housing 31 when there is relative movement therebetween, each housing is provided with an alignment mechanism. The alignment mechanism for the lower roll housing 31 comprises an arrangement of four racks 69 extending down from housing 31 to mesh with certain gears of a rectangular array 76 of lower horizontal connecting rods and gears supported by frame structure 24. A similar arrangement of racks 78 extends upward from upper roll housing 41 to mesh with certain gears of an upper rectangular array 80 of upper horizontal connecting rods and gears supported by frame structure 24 to provide the alignment mechanism for the upper roll housing 41.

In the cooling or quenching station 22, cooling air is delivered through upper and lower nozzles boxes 88 which terminate in elongated nozzles 89 having arcuate openings conforming to the shape of the glass sheets conveyed through the cooling or quenching station 22. A skeleton structure 90 supports the nozzle boxes 88. Adjusting means 92 is provided to adjust the position of nozzle boxes 88 relative to the supporting structure 90 and the path taken by glass sheets through the cooling or quenching station 22.

The present invention has determined that an important cause of surface marking on the glass surfaces results from the rotation of two or more adjacent shaping roll segments at identical peripheral speed. Since the diameter of the segments differ along their axial length, it will be appreciated that a glass sheet that moves along a path normal to the axes of shafts 33 and 47 will be rubbed wherever the peripheral speed of a rotating shaping segment differs significantly from the speed of sheet movement through the roll forming station. Since the individual segments are constructed to have a short axial length, the diameter of each short segment does not vary from end to end an amount sufficient to cause an amount of surface rubbing that results in observable optical defects in the shaped sheet. However, when two or more segments rotate in unison, they behave like a single elongated segment whose diameter varies from end to end an amount sufficient to cause surface rubbing in an amount sufficient to produce observable optical defects, because of the difference in peripheral speed between the relatively large diameter portions and the relatively small diameter portions.

In order to minimize surface marking due to simultaneous rolling engagement by different shaping rolls rotating at the same rotational velocity but different peripheral speeds, the present teaches the rolls forming art to provide means for reducing the frictional force between adjacent shaping roll segments. In one illustrative embodiment of apparatus based on the present invention, means is provided to lighten the segments of shaping rolls 34 and 46. Such means preferably comprises recessess or apertures 99 disposed in spaced circular relation between the shaft receiving aperture 48 and the peripheral surface 49 of the segments of shaping rolls 34 and 46. Since the segmented shaping rolls 34 and 46 extend oblique, the mass of the upper segments bears on the lower segments to contribute to a frictional force when washers positioned between adjacent segments to promote frictionless rotation between adjacent segments become corroded. Lessening the mass also lessens the frictional force.

If the mass of the segments is reduced by drilling a series apertures through the length of the segments, care must be taken to insure that the center of gravity of each segment remains at the center of the shaft on which the segment is mounted. Therefore, it is preferred that the weight reducing means or apertures extend in one or more circular sets with the center of the circular set at the center of the shaft on which the segments are mounted and that the apertures extend parallel to the shaft. It is preferred to make the apertures as large as possible consistent with maintaining the rigidity of the segment structure. Therefore, the apertures are larger for the segments having larger diameter and smaller for the segments having smaller diameter. The smallest segments usually have diameters too small to permit drilling. Also, the end segments are free from apertures at their outward facing ends.

Another means of reducing friction between adjacent segments is to apply a low-friction coating material such as boron nitride to the surfaces 51 of each segment that faces an adjacent segment.

Still another means to reduce the frictional force between adjacent shaping roll segments comprises a flexible open-ring type of washer or separator means 53 or 53' disposed in a circumferential groove 56 of shaft 33 or 47. A series of grooves 0.058 inch wide are machined into the surface of shafts 33 and 47 between the space occupied by each roll segment along the respective shaft. A flexible open ring washer 53 having a thickness of 0.055 inch is snapped into the groove alternately to the step of mounting a shaping roll segment onto the shaft. The grooves 56 are spaced approximately 2 inches on centers and the segments mounted on the grooved shaft between open ring washers 53 resting in adjacent grooves 56 are made of lengths equal to two inches less 0.060 inch. The center segments of the shaping rolls have lengths of 4 inches less 0.120 inch and are mounted between open ring washers disposed in central grooves spaced 4 inches apart along the length of the shafts. Thus, the segments are capable of contacting only one ring washer at a time.

Flexible open-ring washers of the type found suitable for this embodiment of the present invention are available commercially in 0.062 inch thickness as Waldes Tru-arc retaining snap ring 5160-112 or retaining ring X--5133-118, which are ground to 0.055 inch thickness before use. FIG. 5 shows such the former type washer 53 installed and FIG. 6 shows a latter type washer 53' located for application to a groove 56 in a shaft 33 or 47.

FIG. 7 shows still another embodiment of means to reduce friction according to the present invention. In this embodiment an internal sleeve 72 of low friction material such as boron nitride is mounted between the inner wall of each shaping roll segment and its associated shaft. Also shown in FIG. 7 is a washer 73 of low friction material such as boron nitride mounted on shaft 33 or 47 between segment facing surfaces 51 of adjacent shaping roll segments.

While several embodiments of means for reducing the frictional force between adjacent shaping roll segments have been described, it is understood that variations in low friction materials may be employed, such as boron nitride washers or stainless steel snap rings, and also that the segments may be lightened by a number of rows of apertures. Furthermore, the present invention also includes combining means that reduces the mass of the rotating segments with means that reduces the frictional force between adjacent shaping roll segments, such as low friction coatings and open, slip-ring bearings.

The main purpose of this invention is to avoid marking due to simultaneous rolling engagement of a plurality of shaping roll segments rotating against the surface of the glass sheets at peripheral speeds that differ significantly from the speed of glass movement through the roll forming station.

Roll marking is considerably reduced when any simultaneous rolling engagement of a plurality of shaping roll segments on one surface of the glass is caused to have a substantially uniform peripheral velocity rather than uniform angular velocity, such as described for the illustrative embodiment of this invention.

The form of the invention shown and described in this disclosure represents an illustrative preferred embodiment and several variations thereof. For example, the shaping roll sets may be reversely arranged from that of the previous described embodiment with a set of shaping rolls of concave configurations disposed over a set of shaping rolls of convex configuration complementary to the configuration of the concave rolls. It is also understood that other changes may be made without departing from the gist of the present invention as defined in the claimed subject matter which follows.

I claim:

1. In apparatus for shaping glass sheets by the roll forming process comprising:

a set of upper shafts for supporting upper segmented shaping rolls, a set of lower shafts for supporting lower segmented shaping rolls, upper and lower segmented shaping rolls mounted in opposed pairs on said upper and lower shafts, respectively, each of said pairs of shaping rolls comprising a series of adjacent, axially aligned shaping roll segments, at least some of said adjacent segments having different diameters, and at least one of the segments of each of said pairs of shaping rolls being fixed to its supporting shaft to rotate therewith, a predominate number of said segments of said shaping rolls being freely rotatable about their respective shafts, the improvement comprising separator means affixed to said supporting shaft between at least some of said adjacent segments of different diameters, said separator means being spaced on said shaft so that only one of said adjacent segments of different diameters contacts said separator means at a time.

2. The improvement as in claim 1, which further includes means to lighten certain of said segments disposed between said shaft and the outer surface of said segments.

3. The improvement as in claim 2, wherein said means to lighten said certain segments includes apertured portions extending through said certain segments.

4. The improvement as in claim 3, wherein said apertures are arranged in a circular pattern about said shaft.

5. In the apparatus as in claim 3, wherein some shaping roll segments have a larger diameter than other shaping roll segments, the improvement wherein said apertured portions extending through said shaping roll segments of larger diameter are relatively larger in cross-section and said apertured portions extending through said shaping roll segments of smaller diameter are relatively smaller in cross-section.

6. The improvement as in claim 1, wherein said shafts are grooved to receive a snap ring between adjacent segments of said shaping rolls and a low-friction snap ring is mounted in each of said grooves intermediate said adjacent segments.

7. The improvement as in claim 1, wherein said shafts are oriented in an oblique plane.

8. The improvement as in claim 7, which further includes means to lighten certain of said segments disposed between said shaft and the outer surface of said segments.

9. The improvement as in claim 7, wherein said shafts are grooved to receive a snap ring between adjacent segments of said shaping rolls and a low-friction snap ring is mounted in each of said grooves intermediate said adjacent segments.

* * * * *